US00RE44317E

(19) United States
(12) Reissued Patent
Roh et al.

(10) Patent Number: US RE44,317 E
(45) Date of Reissued Patent: Jun. 25, 2013

(54) METHOD FOR TRANSMITTING CONTROL CHANNEL IN A MOBILE COMMUNICATION SYSTEM

(75) Inventors: Dong Wook Roh, Anyang-si (KR); Bong Hoe Kim, Anyang-si (KR); Joon Kui Ahn, Anyang-si (KR); Young Woo Yun, Anyang-si (KR); Ki Jun Kim, Anyang-si (KR); Suk Hyon Yoon, Anyang-si (KR)

(73) Assignee: LG Electronics Inc., Seoul (KR)

(21) Appl. No.: 13/476,982

(22) Filed: May 21, 2012

Related U.S. Patent Documents

Reissue of:
(64) Patent No.: 8,040,846
Issued: Oct. 18, 2011
Appl. No.: 12/524,529
PCT Filed: Feb. 2, 2008
PCT No.: PCT/KR2008/000673
§ 371 (c)(1),
(2), (4) Date: Nov. 6, 2009
PCT Pub. No.: WO2008/094023
PCT Pub. Date: Aug. 7, 2008

U.S. Applications:
(60) Provisional application No. 60/888,060, filed on Feb. 2, 2007.

(30) Foreign Application Priority Data

Aug. 9, 2007 (KR) ..... 10-2007-0080312

(51) Int. Cl.
*H04W 4/00* (2009.01)
*H04W 72/00* (2009.01)
*H04J 3/16* (2006.01)

(52) U.S. Cl.
USPC ..... 370/329; 370/437; 370/468; 455/450

(58) Field of Classification Search
None
See application file for complete search history.

(56) References Cited

U.S. PATENT DOCUMENTS

| | | | |
|---|---|---|---|
| 6,880,103 | B2 | 4/2005 | Kim et al. |
| 7,400,643 | B2 | 7/2008 | Hansen et al. |
| 7,428,406 | B2 | 9/2008 | Raaf |
| 7,460,502 | B2 | 12/2008 | Arima et al. |
| 7,496,048 | B2 | 2/2009 | Ikeda et al. |
| 7,580,386 | B2 | 8/2009 | Oliver |
| 7,620,417 | B2 | 11/2009 | Iochi et al. |
| 7,680,094 | B2 | 3/2010 | Liu |
| 7,688,799 | B2 | 3/2010 | Yamamoto |

(Continued)

FOREIGN PATENT DOCUMENTS

| | | |
|---|---|---|
| KR | 10-2005-0081566 | 8/2005 |
| KR | 10-2006-0053077 | 5/2006 |

(Continued)

OTHER PUBLICATIONS

3rd Generation Partnership Project (3GPP), "Technical Specification Group Radio Access Network; Continuous Connectivity for Packet Data Users (Release 7)", 3GPP TR 25.903 v1.2.0, Nov. 2006, XP-002581122.

(Continued)

*Primary Examiner* — Gregory Sefcheck
(74) *Attorney, Agent, or Firm* — Lee, Hong, Degerman, Kang & Waimey

(57) ABSTRACT

In a mobile communication system using both a discontinuous transmission scheme and a compressed mode transmission scheme, if a preamble and/or a postamble of a channel including control information for transmitting a specific channel overlaps a compressed mode (CM) gap, an overall transmission unit is not transmitted or remaining signals of the transmission unit excluding the preamble and/or the postamble overlapping the CM gap are transmitted.

16 Claims, 8 Drawing Sheets

U.S. PATENT DOCUMENTS

| | | | |
|---|---|---|---|
| 2002/0142778 | A1 | 10/2002 | Saito |
| 2004/0202147 | A1 | 10/2004 | Hakkinen et al. |
| 2005/0025096 | A1 | 2/2005 | Vayanos et al. |
| 2005/0128978 | A1 | 6/2005 | Pecen et al. |
| 2006/0251014 | A1 | 11/2006 | Castor et al. |
| 2007/0206531 | A1 | 9/2007 | Pajukoski et al. |
| 2008/0049683 | A1 | 2/2008 | Nakamata et al. |
| 2008/0102880 | A1 | 5/2008 | Gholmieh et al. |
| 2008/0151822 | A1 | 6/2008 | Hansen et al. |

FOREIGN PATENT DOCUMENTS

| | | |
|---|---|---|
| RU | 2273964 | 4/2006 |
| WO | 0070786 | 11/2000 |
| WO | 0074289 | 12/2000 |

OTHER PUBLICATIONS

Philips, "Continuous Packet Connectivity in Conjunction with Compressed Mode", 3GPP TSG RAN WG1/2 Meeting #47bis, R1-070352, Jan. 2007, XP-050104386.

3rd Generation Partnership Project (3GPP), "Technical Specification Group Radio Access Network; Continuous Connectivity for Packet Data Users (Release 7)", 3GPP TR 25.903 v1.2.1, Feb. 2007, XP-002581123.

Ericsson, "Way Forward for Compressed Mode and CPC", 3GPP TSG-RAN WG1 Meeting #48, R1-071158, Feb. 2007, XP-050105138.

METHOD FOR TRANSMITTING CONTROL CHANNEL IN A MOBILE COMMUNICATION SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue of U.S. Pat. No. 8,040,846, which issued on Oct. 18, 2011, from U.S. application Ser. No. 12/524,529, filed on Nov. 6, 2009, which is the National Stage filing under 35 U.S.C. 371 of International Application No. PCT/KR2008/000673, filed on Feb. 4, 2008, which claims the benefit of earlier filing date and right of priority to Korean Application No. 10-2007-0080312, filed on Aug. 9, 2007, and also claims the benefit of U.S. Provisional Application Ser. No. 60/888,060, filed on Feb. 2, 2007.*

TECHNICAL FIELD

The present invention relates to a mobile communication system, and more particularly to a method for transmitting a control channel in a mobile communication system.

BACKGROUND ART

In uplink transmission, that is, in a case where a user equipment functions as a transmitter, various methods for controlling power such that the capacity of a battery is increased or power consumption of the user equipment is decreased so as to increase the duration of the user equipment have been suggested. Examples of the methods for controlling the power may include a discontinuous transmission scheme.

The discontinuous transmission scheme may be, for example, a method for instantaneously reducing a data transmission output or setting a silent state when a voice signal is not transmitted in a mobile phone or a portable wireless phone. When two persons talk over phone, a talk time of each of the two persons is equal to or less than a half of a total talk time. Thus, if connection to a transmitter is established only during a voice input time, a transmission time may be reduced to 50% or less. Accordingly, advantages including conservation of battery power, reduction of a load of a transmitter amplifier, and channel sharing with another signal in view of time division multiplexing (TDM) can be obtained.

DISCLOSURE OF INVENTION

Accordingly, the present invention is directed to a method for transmitting a control channel in a mobile communication system that substantially obviates one or more problems due to limitations and disadvantages of the related art.

An object of the present invention devised to solve the problem lies on a method for transmitting a control channel in a mobile communication system.

The object of the present invention can be achieved by providing a method for transmitting a first channel and a second channel in a mobile communication system compressed mode transmission scheme, the method comprising: if a transmission interval of one of a preamble and a postamble of the first channel partially overlaps a compressed mode gap, transmitting the first channel in a remaining transmission interval excluding the compressed mode gap from a transmission interval of the first channel; and transmitting the second channel, of which the first channel includes information for detection, at a predetermined time after the transmission of the first channel is started, wherein the system uses a discontinuous transmission (DTX) scheme and a compressed mode transmission scheme.

In the aspect of the present invention, the first channel may be a dedicated physical control channel (DPCCH), and the second channel may be any one of an enhanced-dedicated channel (E-DCH) and a high speed-dedicated physical control channel (HS-DPCCH).

In the aspect of the present invention, the first channel signal and the second channel signal may be multiplexed using different codes or different orthogonal phase components.

In the aspect of the present invention, the first channel and the second channel may not be transmitted, if the preamble of the second channel is a long-length preamble including control information for performing synchronization and power control.

In the aspect of the present invention, each of the first channel and the second channel may include a DTX interval in which a signal is not transmitted according to the discontinuous transmission scheme.

The object of the present invention can be achieved by providing another method for transmitting a control channel, the method comprising: if a transmission interval for a preamble of the control channel partially overlaps a compressed mode gap in a compressed mode transmission scheme, transmitting the preamble of the control channel in a remaining transmission interval excluding the compressed mode gap from the transmission interval; and transmitting the control channel and an expanded channel of which the control channel includes information used for detection, wherein each of the control channel and the expanded channel includes a DTX interval.

In another aspect of the present invention, the expanded channel is an enhanced-dedicated channel (E-DCH) and the control channel is a dedicated physical control channel (DPCCH).

Advantageous Effects

According to an embodiment of the present invention, it is possible to increase efficiency of a mobile communication system. In addition, although transmission error occurs and a portion of one transmission unit cannot be transmitted, the remaining signal is transmitted. Thus, it is possible to prevent waste of transmission resources and perform more efficient resource scheduling. The occurred error is corrected and detected by an error correcting and detecting method applied to the channel so as to increase a probability of transmission/reception success, thereby increasing the effectiveness.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Hereinafter, preferred embodiments of the present invention will be described in detail with reference to the accompanying drawings. The present invention will become more fully understood from the detailed description provided herein below and the accompanying drawings which are given by way of illustration only, and thus do not limit the present invention. The following detailed description includes details in order to provide complete understanding of the present invention. However, it will be apparent to those skilled in the art that the present invention can be embodied without the details. For example, in the following description, specific terms are used, but the present invention is not limited to these terms.

In some cases, known structures and devices are omitted in order to avoid ambiguity of the concept of the present invention or main functions of the structures and the devices are shown in a block diagram and/or a flowchart.

The same reference numbers will be used throughout the drawings to refer to the same or like parts.

Figure 1:
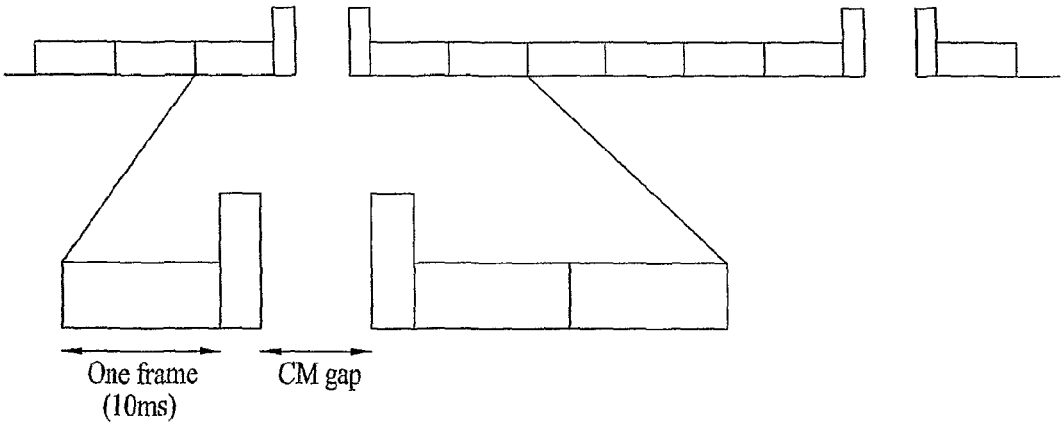
FIG. 1 is a drawing for illustrating a compressed mode transmission scheme.

FIG. 1 is drawing for illustrating a compressed mode transmission scheme.

FIG. 1 shows a schematic frame structure according to the compressed mode transmission scheme. According to the compressed mode transmission scheme, any one frame or two continuous frames is used as a compressed frame including a compressed mode (CM) gap in a frame or between two continuous frames. In other words, some slots of a frame which is determined to be used as the compressed frame, that is, slots included in the CM gap, are not used in data transmission. These slots are used to perform an operation for interrupting data transmission/reception in the CM gap and searching for a neighboring cell and a neighboring network.

In order to reduce the influence of a reduced processing gain due to existence of the CM gap and maintain communication quality, data can be transmitted in a state of increasing transmission power with respect to some slots of the compressed frame. As shown in FIG. 1, slots for transmitting data with the increased transmission power are preferably located before the CM gap is started and after the CM gap is finished. The amount of power increased in the some slots of the compressed frame may be determined according to the reduction of a transmission time. Examples of a factor for measuring communication quality may include a bit error rate (BER) and a frame error rate (FER).

On a network, it can be determined which frame is used as the compressed frame. The compressed frame may be periodically generated in the compressed mode and may be generated by a request if necessary. The rate and the type of the compressed frame may be determined by requirements due to various channel environments and measurements.

Hereinafter, an uplink discontinuous transmission (DTX) scheme will be described as another method for controlling power. In a communication system, in order to reduce the power consumption of a battery of an user equipment and increase an uplink channel capacity, a discontinuous transmission operation is designed in uplink transmission. That is, the user equipment discontinuously transmits data. In view of the user equipment, a method for differently controlling power according to an interval in which the data is transmitted and an interval in which the data is not transmitted, that is, the DTX interval, is used.

For example, if the DTX interval is used, the data is not always transmitted. Accordingly, when the data is transmitted, the user equipment is in a use state or an "ON" state and, when the data is not transmitted, the user equipment is in a state of minimizing power consumption, such as a "sleep" state or an "OFF" state.

If the uplink discontinuous transmission scheme and the compressed mode transmission scheme are simultaneously operated, an accurate operation of the user equipment is preferably examined. Hereinafter, the operation of the user equipment according to embodiments of the present invention when the uplink compressed mode transmission scheme and the uplink discontinuous transmission scheme are simultaneously applied will be described in detail.

First, the operation of the user equipment associated with the discontinuous transmission of an enhanced-dedicated channel (E-DCH) according to an embodiment of the present invention will be described.

Figure 2:
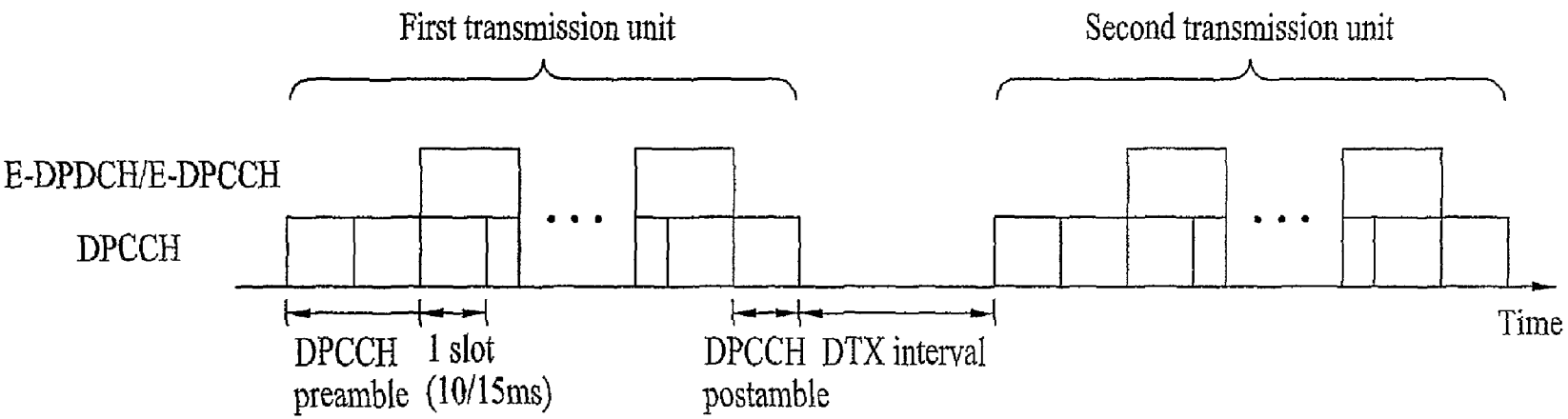
FIG. 2 is a drawing for illustrating a discontinuous transmission operation of an enhanced-dedicated channel (E-DCH)

FIG. 2 is a drawing for illustrating a discontinuous transmission operation of the E-DCH.

Referring to FIG. 2, the E-DCH is a channel for transmitting uplink packet data and is mapped to a physical channel such as an enhanced dedicated physical data channel (E-DPDCH) and an enhanced dedicated physical control channel (E-DPCCH). The E-DPDCH is the physical channel which is used to transmit E-DCH data and the E-DPCCH is the physical channel which is used to transmit control information associated with the E-DCH. In general, the E-DPDCH and the E-DPCCH are simultaneously transmitted.

When the E-DCH is transmitted through the E-DPDCH and the E-DPCCH, in order to allow a reception side, for example, a node-B, to easily perform E-DCH demodulation using E-DCH detection or channel estimation, a dedicated physical control channel (DPCCH) is also transmitted. More particularly, the control information generated in a first layer is transmitted through DPCCH. For example, at least one of feedback information (FBI), a transmit power control (TPC) command and transport-format combination indicator (TFCI) including an uplink pilot for supporting the channel estimation can be transmitted.

Meanwhile, the control information which is not transmitted through the DPCCH, that is, the control information which is characteristic in the E-DCH, can be transmitted through the E-DPCCH as the control information used in the E-DCH demodulation. For example, the TFCI, HARQ information and scheduling request information can be transmitted through the E-DPCCH. At this time, the E-DPDCH, the E-DPCCH and the DPCCH can be simultaneously transmitted and are multiplexed using different codes or different orthogonal phase components.

Figure 3:
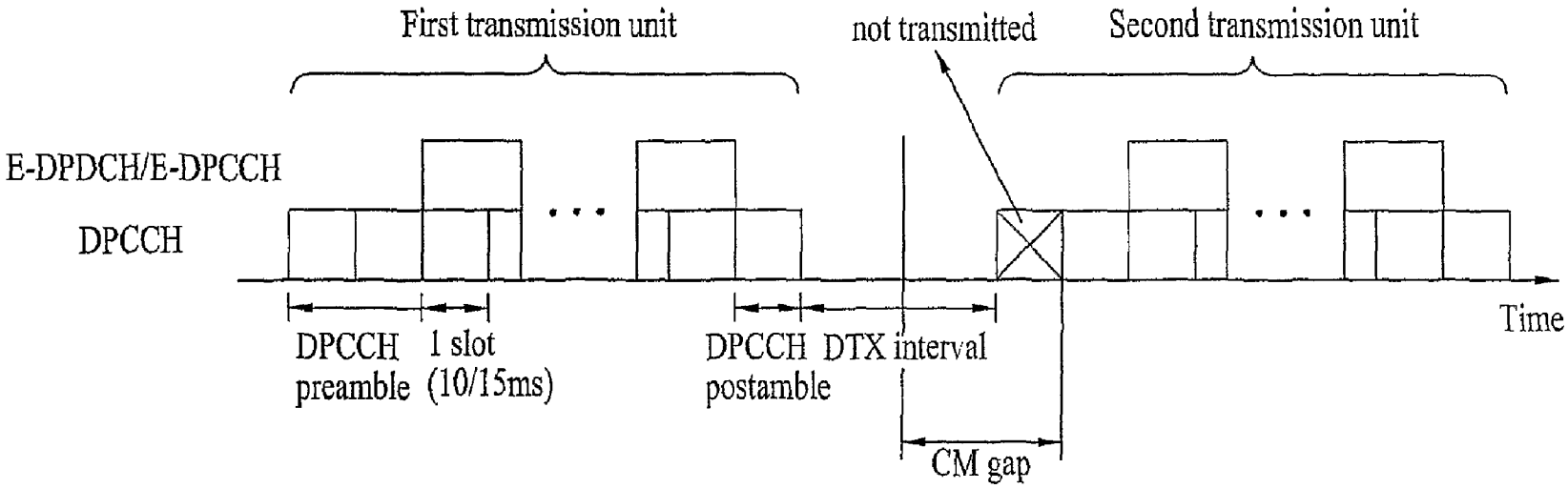
FIG. 3 is a drawing for illustrating the operation of a user equipment according to an embodiment of the present invention when the compressed mode transmission scheme and the discontinuous transmission scheme are simultaneously applied in E-DCH transmission.

As shown in FIG. 2, the user equipment starts DPCCH transmission before transmitting the E-DPDCH and the E-DPCCH. In other words, the E-DPDCH and E-DPCCH transmission is started at a predetermined time after the DPCCH transmission is started or after a predetermined number of slots are transmitted. The DPCCH signal which is transmitted before the E-DPDCH and the E-DPCCH are transmitted is called a DPCCH preamble. FIG. 3 shows a case where two slots are used as the DPCCH preamble. Hereinafter, the number of slots used as the DPCCH preamble is denoted by N.

The user equipment transmits the DPCCH at a predetermined time after the E-DPDCH and E-DPCCH transmission is finished or after a predetermined number of slots are transmitted, and then completes the E-DCH transmission process. The DPCCH signal which is transmitted after the E-DPDCH and E-DPCCH transmission is finished is called a DPCCH postamble. FIG. 2 shows a case where one slot is used as the DPCCH postamble. Hereinafter, the number of slots used as the DPCCH postamble is denoted by M.

As described above, the DPCCH preamble and the DPCCH postamble are respectively transmitted before and after the E-DPDCH and the E-DPCCH are transmitted such that the reception side, for example, the node-B detects the E-DCH with higher probability of success.

In the DPCCH preamble, the number of slots used as the DPCCH preamble may be determined according to the data transmitting state of the user equipment. For example, if the user does not transmit the data during a time longer than a predetermined time interval before transmitting the E-DCH, more slots can be used as the DPCCH preamble, compared with a case where the user does not transmit the data during the predetermined time interval or less.

If the user does not transmit the data during the predetermined time interval or less, the number N1 of slots used as the DPCCH preamble may be 2. In contrast, if the user does not transmit the data during the time longer than the predetermined time interval, the number N2 of slots used as the DPCCH preamble may be 15. This is because, if the data is not transmitted during a longer time, it is preferable that control information necessary for uplink synchronization should be transmitted and more control information required for performing power control should be transmitted.

As shown in FIG. 2, in the DPCCH transmission, as described above, the DPCCH preamble is transmitted by a predetermined number N of slots, for example, two slots, before transmitting the E-DPDCH and the E-DPCCH, and the DPCCH postamble is transmitted by a predetermined number M of slots, for example, one slot, after transmitting the E-DPDCH and the E-DPCCH. A process of transmitting the DPCCH preamble, transmitting the E-DPDCH and the E-DPCCH, and transmitting the DPCCH postamble is considered to one transmission unit. One transmission unit shown at the left side of FIG. 2 is referred to as a first transmission unit and one transmission unit shown at the right of FIG. 2 is referred to as a second transmission unit.

In this case, a predetermined DTX interval may be set between the first transmission unit and the second transmission unit. The data is not transmitted in the DTX interval. If the DTX interval is finished, the DPCCH preamble is transmitted again, the E-DCH, that is, the E-DPDCH and the E-DPCCH, is transmitted, and the DPCCH postamble is transmitted, thereby finishing the data transmission of one transmission unit.

Now, a method for transmitting the E-DCH by the user equipment when the discontinuous transmission scheme and the compressed mode transmission scheme of the E-DCH are simultaneously applied will be described.

FIG. 3 is a drawing for illustrating the operation of the user equipment according to an embodiment of the present invention when the compressed mode transmission scheme and the discontinuous transmission scheme are simultaneously applied in E-DCH transmission.

As described above, for the E-DCH transmission, the E-DPDCH and the E-DPCCH are transmitted and the DPCCH is transmitted together with the E-DPDCH and the E-DPCCH. The DTX interval according to the discontinuous transmission scheme exists between the first transmission unit which is first transmitted and the second transmission unit which is next transmitted.

That is, the transmission of the data corresponding to the first transmission unit is finished and, after the DTX interval, the transmission of the data corresponding to the second transmission unit is started by transmitting the DPCCH preamble.

At this time, as shown in FIG. 3, if a portion of the

DPCCH preamble of the second transmission unit is determined to be transmitted in the CM gap according to the compressed mode transmission scheme, the DPCCH preamble is not transmitted in a portion or all slots overlapping the CM gap, but the E-DPDCH and the E-DPCCH as well as the remaining DPCCH preamble, the DPCCH signal and the DPCCH postamble are transmitted, according to the embodiment of the present invention. If the DPCCH postamble is determined to be transmitted in the CM gap according to the compressed mode transmission scheme, the DPCCH postamble is not transmitted in a portion or all of the slots overlapping the CM gap, but the E-DPDCH and the E-DPCCH as well as the DPCCH preamble, the DPCCH signal and the remaining DPCCH postamble are transmitted.

This is because an error check sum (ECS) for checking error may be used in the E-DCH data, a HARQ operation is performed, and deterioration in reception capability due to the lack of the DPCCH preamble and the DPCCH postamble at the reception side can be easily recovered although at least one of the DPCCH preamble and the DPCCH postamble is determined to be transmitted in the CM gap and cannot be transmitted.

Figure 4:
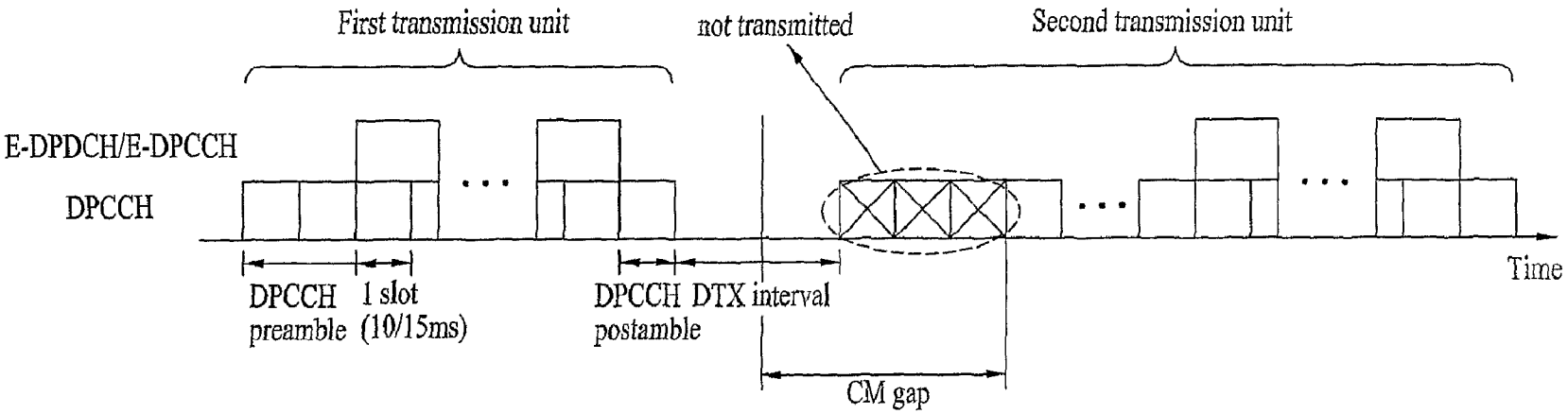
FIG. 4 is a drawing for illustrating the operation of an user equipment according to another embodiment of the present invention when the compressed mode transmission scheme and the discontinuous transmission scheme are simultaneously applied in E-DCH transmission.

FIG. 4 is a drawing for illustrating the operation of the user equipment according to another embodiment of the present invention when the compressed mode transmission scheme and the discontinuous transmission scheme are simultaneously applied in E-DCH transmission.

If the user equipment does not transmit the data during the time longer than the predetermined time interval, as shown in FIG. 4, the number N2 of slots used as the DPCCH preamble may be set to 15. This is because, as described, if the data is not transmitted during the longer time, it is preferable that the control information necessary for uplink synchronization should be transmitted and more control information required for performing power control should be transmitted.

In the present embodiment, similar to the embodiment of FIG. 3, if a portion of the long-length DPCCH preamble is determined to be transmitted in the CM gap according to the compressed mode transmission scheme, the long-length DPCCH preamble is not transmitted in a portion or all of slots overlapping the CM gap, but the E-DPDCH and the E-DPCCH as well as the remaining DPCCH preamble, the DPCCH signal and the DPCCH postamble are transmitted, according to the embodiment of the present invention.

Similarly, if the DPCCH postamble is determined to be transmitted in the CM gap according to the compressed mode transmission scheme, the DPCCH postamble is not transmitted in a portion or all of the slots overlapping the CM gap, but the E-DPDCH and the E-DPCCH as well as the DPCCH preamble, the DPCCH signal and the remaining DPCCH postamble are transmitted.

Figure 5:
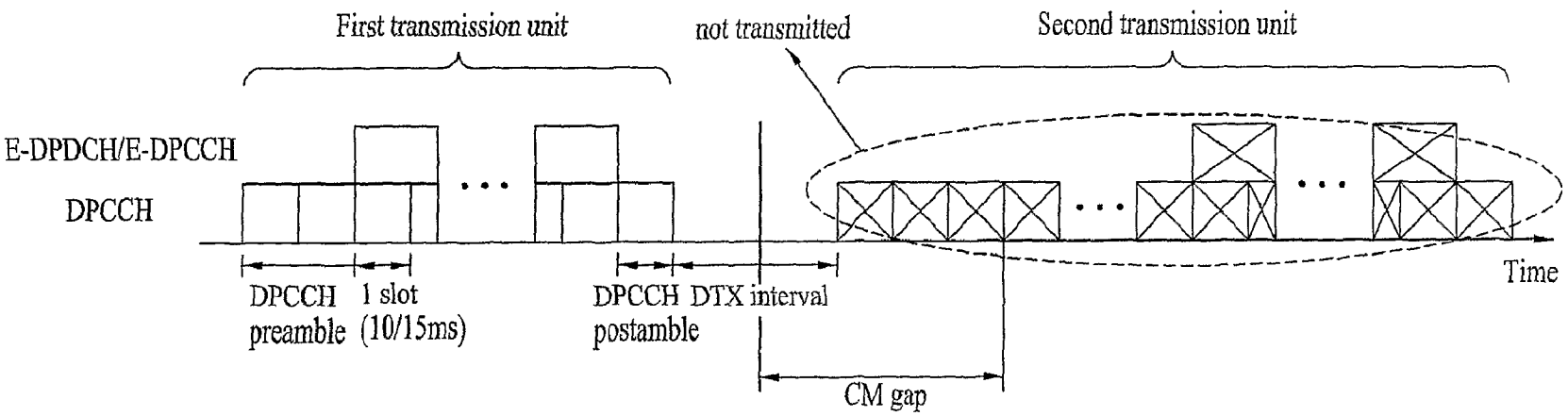
FIG. 5 is a drawing for illustrating the operation of an user equipment according to another embodiment of the present invention when the compressed mode transmission scheme and the discontinuous transmission scheme are simultaneously applied in E-DCH transmission.

FIG. 5 is a drawing for illustrating the operation of the user equipment according to another embodiment of the present invention when the compressed mode transmission scheme and the discontinuous transmission scheme are simultaneously applied in E-DCH transmission.

In the present embodiment, unlike the embodiments shown in FIGS. 3 and 4, if a portion of the long-length DPCCH preamble is determined to be transmitted in the CM gap according to the compressed mode transmission scheme, the DPCCH and the remaining channel signals of the overall transmission unit associated with the long-length DPCCH preamble as well as slots overlapping the CM gap are not transmitted according to the embodiment of the present invention. That is, all of the remaining DPCCH preamble, the DPCCH signal, the DPCCH postamble, the E-DPDCH and the E-DPCCH are not transmitted.

Similarly, if the DPCCH postamble is determined to be transmitted in the CM gap according to the compressed mode transmission scheme, the DPCCH and the remaining channel signals of the overall transmission unit associated with the DPCCH preamble as well as slots overlapping the CM gap are not transmitted according to the embodiment of the present invention. That is, all of the DPCCH preamble, the DPCCH signal, the remaining DPCCH postamble, the E-DPDCH and the E-DPCCH are not transmitted.

The control information for uplink synchronization and the control information required for controlling the power are transmitted through the long-length DPCCH preamble transmitted after the data is not transmitted during the predetermined time interval. Accordingly, if the Long-length DPCCH preamble is not normally received, it is difficult to establish uplink synchronization. In this case, fatal error may occur in the data transmission/reception.

Next, the operation of the user equipment associated with the discontinuous transmission of a high speed-dedicated physical control channel (HS-DPCCH) will be described as one embodiment of the present invention.

Figure 6:
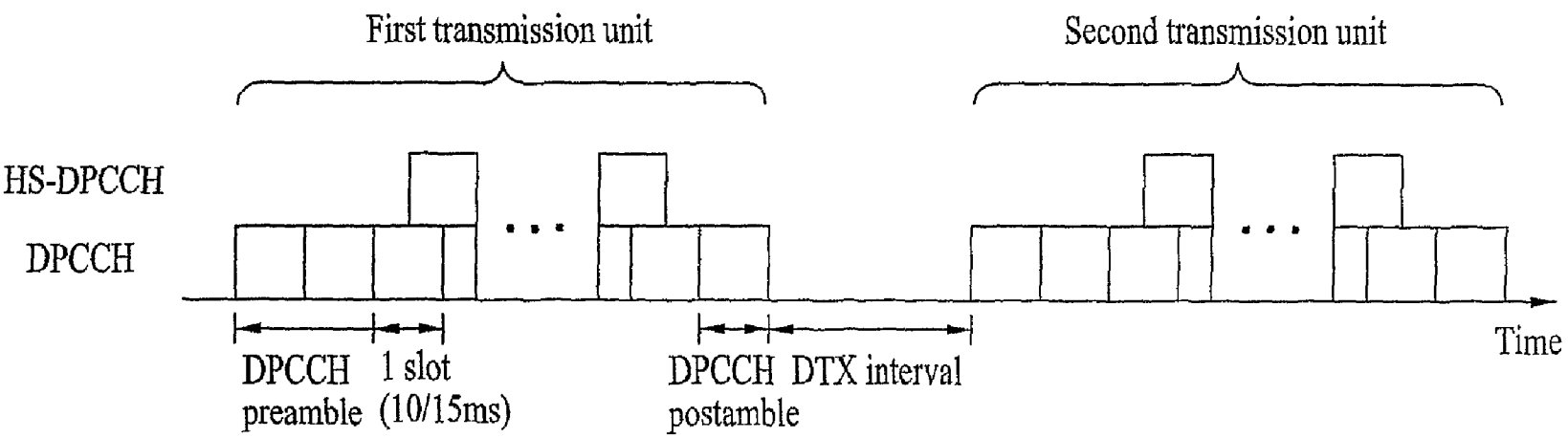
FIG. 6 is a drawing for illustrating a discontinuous transmission operation of a high speed-dedicated physical control channel (HS-DPCCH)

FIG. 6 is a drawing for illustrating a discontinuous transmission operation of the HS-DPCCH.

The HS-DPCCH sends an uplink feedback signal associated with the transmission of a high speed-downlink shared channel (HS-DSCH). The feedback signal associated with the HS-DSCH includes a HARQ acknowledgement (ACK/NACK) and a channel quality indication.

When the HS-DPCCH is transmitted, similar to the E-DCH, in order to allow the reception side, for example, the node-B, to easily perform E-DCH demodulation using E-DCH detection or channel estimation, the DPCCH is also transmitted. That is, the control information for controlling the power and the necessary control information including a pilot for performing the channel estimation can be transmitted through the DPCCH. At this time, the HS-DPCCH and the DPCCH may be simultaneously transmitted and are multiplexed using different codes or different orthogonal phase components.

As shown in FIG. 6, the user equipment starts the transmission of the DPCCH before transmitting the HS-DPCCH. That is, the transmission of the HS-DPCCH is started at a predetermined time after the transmission of the DPCCH is started or a predetermined number of slots are transmitted. The DPCCH signal which is transmitted before the HS-DPCCH is transmitted is called a DPCCH preamble. FIG. 6 shows a case where two slots are used as the DPCCH preamble. Hereinafter, the number of slots used as the DPCCH preamble is denoted by N.

The user equipment transmits the DPCCH at a predetermined time after the HS-DPCCH transmission is finished or after a predetermined number of slots are transmitted, and then completes the HS-DPCCH transmission process. The DPCCH signal which is transmitted after the HS-DPCCH transmission is finished is called a DPCCH postamble. FIG. 6 shows a case where one slot is used as the DPCCH postamble. Hereinafter, the number of slots used as the DPCCH postamble is denoted by M.

As described above, the DPCCH preamble and the DPCCH postamble are respectively transmitted before and after the HS-DPCCH are transmitted such that the reception side, for example, the node-B detects the HS-DPCCH with higher probability of success.

As shown in FIG. 6, in the DPCCH transmission, as described above, the DPCCH preamble is transmitted by the predetermined number N of slots, for example, two slots, before the HS-DPCCH transmission and the DPCCH postamble is transmitted by the predetermined number M of slots, for example, one slot, after the HS-DPCCH transmission.

A process of transmitting the DPCCH preamble, transmitting the HS-DPCCH, and transmitting the DPCCH is considered as one transmission unit. One transmission unit shown at the left side of FIG. 6 is referred to as a first transmission unit and one transmission unit shown at the right of FIG. 6 is referred to as a second transmission unit.

In this case, a predetermined DTX interval may be set between the first transmission unit and the second transmission unit and the data is not transmitted in the DTX interval. If the DTX interval is finished, the DPCCH preamble is transmitted again, the DPCCH and the HS-DPCCH are transmitted, and the DPCCH postamble is transmitted, thereby finishing the data transmission of one transmission unit.

At this time, in comparison with the discontinuous transmission scheme of the E-DCH, while the E-DPDCH and the E-DPCCH are transmitted from a slot immediately next to the two slots, in which the DPCCH preamble is transmitted, in the discontinuous transmission scheme of the E-DCH, the HS-DPCCH is transmitted from a middle portion of a slot immediately next to the slot, in which the DPCCH preamble is transmitted, in the discontinuous transmission scheme of the HS-DPCCH as shown in FIG. 6.

Even in the transmission of the DPCCH postamble, while the E-DPDCH and the E-DPCCH are transmitted up to a slot immediately before a slot, in which the DPCCH postamble is transmitted, in the discontinuous transmission scheme of the E-DCH, the HS-DPCCH is transmitted until a middle portion of a slot immediately before a slot, in which the DPCCH postamble is transmitted, in the discontinuous transmission scheme of the HS-DPCCH as shown in FIG. 6.

Now, a method for transmitting the HS-DPCCH by the user equipment when the discontinuous transmission scheme and the compressed mode transmission scheme of the HS-DPCCH are simultaneously applied will be described.

Figure 7:
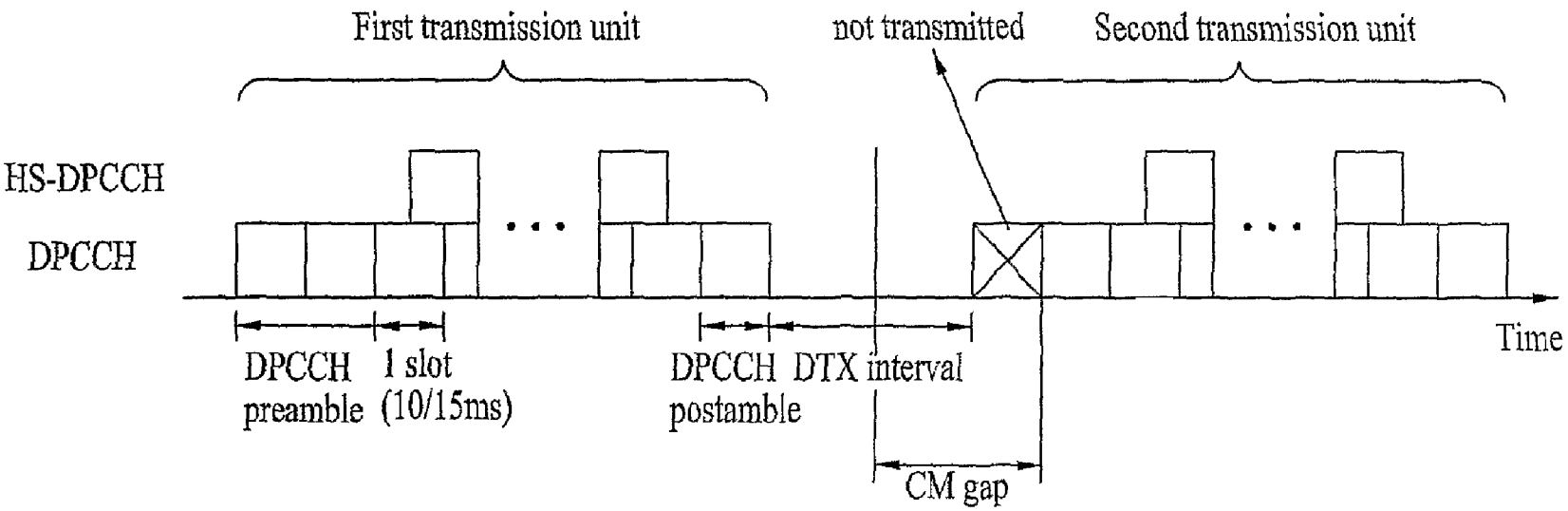
FIG. 7 is a drawing for illustrating the operation of a user equipment according to an embodiment of the present invention when the compressed mode transmission scheme and the discontinuous transmission scheme are simultaneously applied in HS-DPCCH transmission.

FIG. 7 is a drawing for illustrating the operation of the user equipment according to an embodiment of the present invention when the compressed mode transmission scheme and the discontinuous transmission scheme are simultaneously applied in HS-DPCCH transmission.

As described above, for the HS-DPCCH transmission, the HS-DPCCH is transmitted and the DPCCH is transmitted together with the HS-DPCCH. The DTX interval according to the discontinuous transmission scheme exists between the first transmission unit which is first transmitted and the second transmission unit which is next transmitted.

That is, the transmission of the data corresponding to the first transmission unit is finished and, after the DTX interval, the transmission of the data corresponding to the second transmission unit is started by transmitting the DPCCH preamble.

At this time, if a portion of the DPCCH preamble of the second transmission unit is determined to be transmitted in the CM gap according to the compressed mode transmission scheme, the DPCCH preamble is not transmitted in a portion or all of slots overlapping the CM gap, but the HS-DPCCH as well as the remaining DPCCH preamble, the DPCCH signal and the DPCCH postamble are transmitted, according to the embodiment of the present invention.

If the DPCCH postamble is determined to be transmitted in the CM gap according to the compressed mode transmission scheme, the DPCCH postamble is not transmitted in a portion or all of the slots overlapping the CM gap, but the HS-DPCCH as well as the DPCCH preamble, the DPCCH signal and the remaining DPCCH postamble are transmitted.

Figure 8:
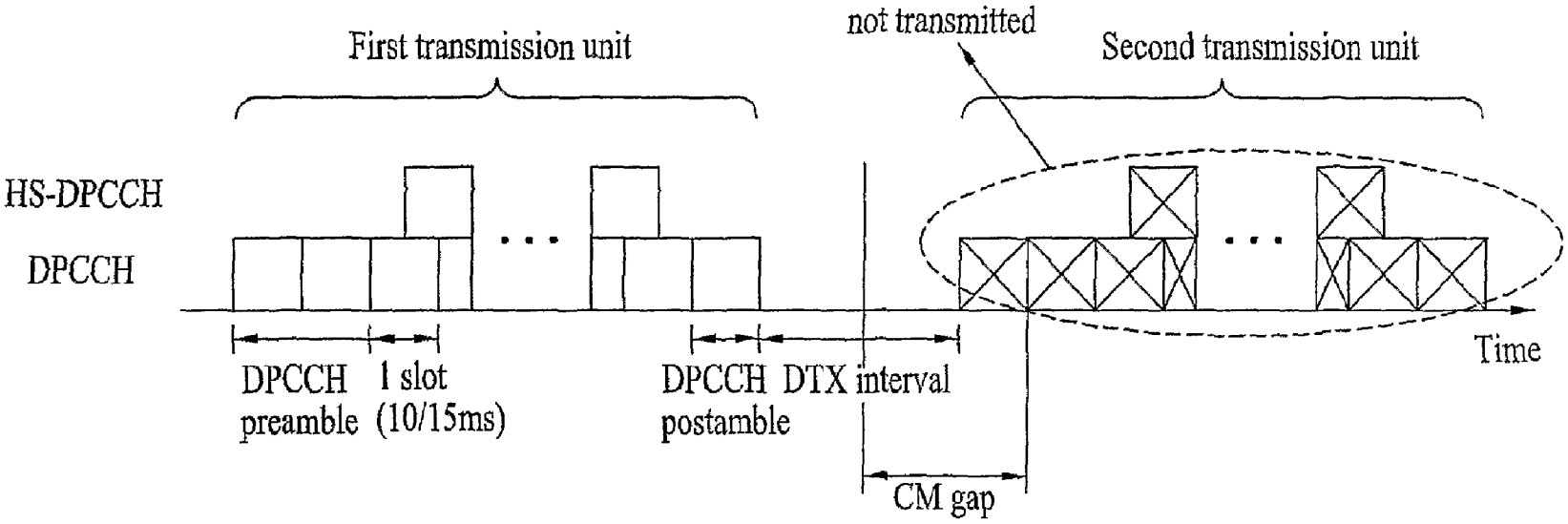
FIG. 8 is a drawing for illustrating the operation of a user equipment according to another embodiment of the present invention when the compressed mode transmission scheme and the discontinuous transmission scheme are simultaneously applied in HS-DPCCH transmission.

FIG. 8 is a drawing for illustrating the operation of the user equipment according to another embodiment of the present invention when the compressed mode transmission scheme and the discontinuous transmission scheme are simultaneously applied in HS-DPCCH transmission.

In the present embodiment, unlike the embodiment shown in FIG. 7, if a portion of the DPCCH preamble is determined to be transmitted in the CM gap according to the compressed mode transmission scheme, the DPCCH and the remaining channel signals of the overall transmission unit associated with the DPCCH preamble as well as slots overlapping the CM gap are not transmitted according to the embodiment of the present invention.

Similarly, if the DPCCH postamble is determined to be transmitted in the CM gap according to the compressed mode transmission scheme, the DPCCH and the remaining channel signals of the overall transmission unit associated with the DPCCH preamble as well as slots overlapping the CM gap are not transmitted according to the embodiment of the present invention. That is, all of the DPCCH preamble, the DPPCCH signal, the remaining DPCCH postamble and the HS-DPCCH are not transmitted.

This is because the ECS for checking the error may not be applied to the HS-DPCCH data and the HARQ operation may not be performed. Accordingly, if at least one of the DPCCH preamble and the DPCCH postamble is transmitted in the CM gap and thus cannot be transmitted, a probability of deterioration in reception capability due to the lack of the DPCCH preamble and the DPCCH postamble at the reception side is high.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents. Although examples which are applied when the E-DPDCH/E-DPCCH and the HS-DPCCH are transmitted together with the DPCCH are described in the above-described embodiments, it will be apparent to those skilled in the art that a method equal to or similar to the transmission method described in the present specification may be used with respect to various other channel signals.

The present invention is not limited to the embodiments described herein and includes a widest range including principles and features disclosed herein.

What is claimed is:

1. A method for transmitting channel signals in a mobile communication system using a compressed mode transmission scheme and a discontinuous transmission (DTX) scheme, the method comprising:

if a transmission interval of one of a preamble and a postamble of a second channel signal partially overlaps a compressed mode gap, transmitting the second channel signal in a remaining transmission interval excluding the preamble or the postamble which is partially overlapped with the compressed mode gap, wherein the second channel signal includes information used for detecting a first channel signal and the compressed mode gap is an interval in which the channel signals are not transmitted according to the compressed mode transmission scheme; and transmitting the first channel signal at a predetermined time after the transmission of the second channel signal is started.

2. The method according to claim 1, wherein the second channel signal is transmitted through a dedicated physical control channel (DPCCH), and the first channel signal is transmitted through one of an enhanced-dedicated channel (E-DCH) and a high speed-dedicated physical control channel (HS-DPCCH).

3. The method according to claim 1, wherein the first channel signal and the second channel signal are multiplexed using different codes.

4. The method according to claim 1, wherein each of the first channel signal and the second channel signal includes a DTX interval in which no signal is transmitted according to the DTX scheme.

5. A user equipment (UE) for transmitting channel signals in a mobile communication system using a compressed mode transmission scheme and a discontinuous transmission (DTX) scheme, the UE comprising:

if a transmission interval of one of a preamble and a postamble of a second channel signal partially overlaps a compressed mode gap, means for transmitting the second channel signal in a remaining transmission interval excluding the preamble or the postamble which is partially overlapped with the compressed mode gap, wherein the second channel signal includes information used for detecting a first channel signal and the compressed mode gap is an interval in which the channel signals are not transmitted according to the compressed mode transmission scheme; and means for transmitting the first channel signal at a predetermined time after the transmission of the second channel signal is started.

6. The user equipment according to claim 5, wherein the second channel signal is transmitted through a dedicated physical control channel (DPCCH), and the first channel signal is transmitted through one of an enhanced-dedicated channel (E-DCH) and a high speed-dedicated physical control channel (HS-DPCCH).

7. The user equipment according to claim 5, wherein each of the first channel signal and the second channel signal includes a DTX interval in which no signal is transmitted according to the DTX scheme.

8. The user equipment according to claim 5, wherein the first channel signal and the second channel signal are multiplexed using different codes.

9. A method for receiving channel signals in a mobile communication system using a compressed mode transmission scheme and a discontinuous transmission (DTX) scheme, the method comprising:

if a transmission interval of one of a preamble and a postamble of a second channel signal partially overlaps a compressed mode gap, receiving, by an e-Node B (eNB), the second channel signal in a remaining transmission interval excluding the preamble or the postamble which is partially overlapped with the compressed mode gap, wherein the second channel signal includes information used for detecting a first channel signal and the compressed mode gap is an interval in which the channel signals are not transmitted according to the compressed mode transmission scheme; and receiving, by the eNB, the first channel signal at a predetermined time after the transmission of the second channel signal is started.

10. The method according to claim 9, wherein the second channel signal is transmitted through a dedicated physical control channel (DPCCH), and the first channel signal is transmitted through one of an enhanced- dedicated channel (E-DCH) and a high speed-dedicated physical control channel (HS-DPCCH).

11. The method according to claim 9, wherein the first channel signal and the second channel signal are multiplexed using different codes.

12. The method according to claim 9, wherein each of the first channel signal and the second channel signal includes a DTX interval in which signal is transmitted according to the DTX scheme.

13. An e-Node B (eNB) for receiving channel signals in a mobile communication system using a compressed mode transmission scheme and a discontinuous transmission (DTX) scheme, the eNB comprising:

if a transmission interval of one of a preamble and a postamble of a second channel signal partially overlaps a compressed mode gap, means for receiving the second channel signal in a remaining transmission interval excluding the preamble or the postamble which is partially overlapped with the compressed mode gap, wherein the second channel signal includes information used for detecting a first channel signal and the compressed mode gap is an interval in which the channel signals are not transmitted according to the compressed mode transmission scheme; and means for receiving the first channel signal at a predetermined time after the transmission of the second channel signal is started.

14. The eNB according to claim 13, wherein the second channel signal is transmitted through a dedicated physical control channel (DPCCH), and the first channel signal is transmitted through one of an enhanced-dedicated channel (E-DCH) and a high speed-dedicated physical control channel (HS-DPCCH).

15. The eNB according to claim 13, wherein the first channel signal and the second channel signal are multiplexed using different codes.

16. The eNB according to claim 13, wherein each of the first channel signal and the second channel signal includes a DTX interval in which no signal is transmitted according to the DTX scheme.

* * * * *